United States Patent
Lee et al.

(10) Patent No.: US 10,547,098 B2
(45) Date of Patent: Jan. 28, 2020

(54) DOUBLE LOOP ANTENNA

(71) Applicant: WITS Co., Ltd., Yongin-si, Gyeonggi-do (KR)

(72) Inventors: Sang Beom Lee, Suwon-si (KR); Hyung Wook Cho, Suwon-si (KR); Jun Seung Yi, Suwon-si (KR); Yu Jin Lee, Suwon-si (KR); Jae Suk Sung, Suwon-si (KR); Dae Ki Lim, Suwon-si (KR); Seung Hun Ryu, Suwon-si (KR); Ki Won Chang, Suwon-si (KR); Jae Hyoung Cho, Suwon-si (KR); Si Hyung Kim, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 155 days.

(21) Appl. No.: 15/800,887

(22) Filed: Nov. 1, 2017

(65) Prior Publication Data
US 2018/0205132 A1  Jul. 19, 2018

(30) Foreign Application Priority Data

Jan. 18, 2017 (KR) .......................... 10-2017-0008803

(51) Int. Cl.
*H01Q 1/36* (2006.01)
*H01Q 7/00* (2006.01)
(Continued)

(52) U.S. Cl.
CPC .............. *H01Q 1/22* (2013.01); *H01F 38/14* (2013.01); *H01P 7/005* (2013.01); *H01Q 7/00* (2013.01); *H04B 5/0081* (2013.01); *H01Q 25/00* (2013.01)

(58) Field of Classification Search
CPC ........... H01F 38/14; H01P 7/005; H01Q 1/22; H01Q 11/12; H01Q 25/00; H01Q 7/00; H01Q 1/2225; H01Q 5/378; H04B 5/0081
See application file for complete search history.

(56) References Cited

U.S. PATENT DOCUMENTS

| 4,583,099 A * | 4/1986 | Reilly ................... G01V 15/00 257/E27.114 |
| 7,495,626 B2 * | 2/2009 | Hart ........................ H01Q 11/12 343/742 |

(Continued)

FOREIGN PATENT DOCUMENTS

| CN | 101378085 A | 3/2009 |
| CN | 101501927 A | 8/2009 |

(Continued)

OTHER PUBLICATIONS

Chinese Office Action dated Oct. 18, 2019 issued in corresponding Chinese Patent Application No. 201810018361.7.

*Primary Examiner* — Tho G Phan

(74) *Attorney, Agent, or Firm* — Harness, Dickey & Pierce, P.L.C.

(57) ABSTRACT

A double loop antenna includes a source loop comprising: a spiral-shaped conductive source coil pattern disposed on a top surface of a board, and a source capacitor pattern comprising symmetrical conductive patterns disposed on the top surface and a bottom surface of the board; and a resonance loop comprising: a spiral-shaped conductive resonance coil pattern disposed on the bottom surface of the board, and a resonance capacitor pattern comprising symmetrical conductive patterns disposed on the top surface and the bottom surface of the board, wherein the source coil pattern and the resonance coil pattern are formed on different surfaces of the board.

12 Claims, 3 Drawing Sheets

(51) Int. Cl.
*H01Q 1/22* (2006.01)
*H01P 7/00* (2006.01)
*H01F 38/14* (2006.01)
*H04B 5/00* (2006.01)
*H01Q 25/00* (2006.01)

(56) References Cited

U.S. PATENT DOCUMENTS

| | | | |
|---|---|---|---|
| 7,768,466 B2 * | 8/2010 | Chi | H01Q 9/26 |
| | | | 343/700 MS |
| 7,990,337 B2 * | 8/2011 | Kato | G06K 19/07749 |
| | | | 343/700 MS |
| 9,306,283 B2 * | 4/2016 | Shimizu | H01Q 1/243 |
| 9,543,651 B2 * | 1/2017 | Lin | H01Q 7/00 |
| 9,674,646 B2 * | 6/2017 | Jang | H01Q 1/273 |
| 2012/0049986 A1 | 3/2012 | Cho et al. | |
| 2016/0028159 A1 * | 1/2016 | Moon | H01Q 7/00 |
| | | | 343/749 |

FOREIGN PATENT DOCUMENTS

| | | |
|---|---|---|
| CN | 103053073 A | 4/2013 |
| CN | 103401063 A | 11/2013 |
| CN | 103858276 A | 6/2014 |
| CN | 103943776 A | 7/2014 |
| CN | 104078745 A | 10/2014 |
| CN | 104285358 A | 1/2015 |
| JP | H 11195921 A | 7/1999 |
| JP | 4592872-82 | 12/2010 |
| KR | 10-2016-0011784 A | 2/2014 |
| KR | 10-1441453 B1 | 9/2014 |
| WO | WO-2010143849 A2 | 12/2010 |
| WO | WO-2016194495 A1 | 12/2016 |

* cited by examiner

DOUBLE LOOP ANTENNA

CROSS-REFERENCE TO RELATED APPLICATIONS

This application claims benefit of priority to Korean Patent Application No. 10-2017-0008803 filed on Jan. 18, 2017 in the Korean Intellectual Property Office, the disclosure of which is incorporated herein by reference in its entirety.

BACKGROUND

1. Field

The present disclosure relates to a double loop antenna.

2. Description of Related Art

As the field of mobile communications continues to develop, the number of users desiring to receive various information contents, to receive streaming video in real time, or the like, has increased. Accordingly, a technology of an antenna for high-speed data transmissions and high capacity information transmissions has been continuously developed.

Meanwhile, as short-range communications functions such as near field communications (NFC), magnetic secure transmissions (MST), wireless power transmissions (WPT), and radio frequency identifications (RFID) are applied to portable electronic devices such as wearable devices, smartphones, portable multimedia players (PMP), and the like, it is becoming possible to use services such as data exchange, personal authentication, wireless payments, wireless charging, and the like, using the portable electronic devices.

For short-range communications, the portable electronic device includes an antenna having a loop pattern therein. The loop pattern antenna employs a double resonance loop to increase a magnetic field. The double resonance loop refers to an antenna structure increasing the magnetic field using two resonance loops, and in order to configure the double resonance loop, two chip capacitors are required. The double loop antenna including the chip capacitors may be limited in terms of space due to the trend for portable electronic devices to be miniaturized and slimmed.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a double loop antenna includes: a source loop including: a spiral-shaped conductive source coil pattern disposed on a top surface of a board, and a source capacitor pattern including symmetrical conductive patterns disposed on the top surface and a bottom surface of the board; and a resonance loop including: a spiral-shaped conductive resonance coil pattern disposed on the bottom surface of the board, and a resonance capacitor pattern including symmetrical conductive patterns disposed on the top surface and the bottom surface of the board, wherein the source coil pattern and the resonance coil pattern are formed on different surfaces of the board.

The source coil pattern and the resonance coil pattern may be disposed on different regions in a thickness direction of the board.

The source capacitor pattern may extend from the source coil pattern.

The conductive patterns of the source capacitor pattern and the source coil pattern may have the same line width and thickness.

The source capacitor pattern may be disposed on an outer periphery of the board.

The resonance capacitor pattern may extend from the resonance coil pattern.

The resonance capacitor pattern may be disposed on an inside of the board and may be surrounded by the source coil pattern and the resonance coil pattern.

The resonance capacitor pattern may include a spiral shape.

The conductive patterns of the source capacitor pattern may be a metal-insulator-metal (MIM) capacitor.

The conductive patterns of the resonance capacitor pattern may be a metal-insulator-metal (MIM) capacitor.

The board may include an inner layer, and a conductive pattern of the inner layer may be symmetrical with either one or both of the conductive patterns of the source capacitor pattern and the conductive patterns of the resonance capacitor pattern.

The source loop and the resonance loop may be electrically separated from each other.

In another general aspect, a double loop antenna includes: a source loop including a first coil and a first capacitor connected to each other in parallel; and a resonance loop including a second coil and a second capacitor connected to each other in series and electrically separated from the source loop, wherein each of the first capacitor and the second capacitor is a metal-insulator-metal (MIM) capacitor including conductive patterns formed on a top surface and a bottom surface of a board.

Either one or both of the first capacitor and the second capacitor may include conductive patterns disposed in three layers of the board.

The conductive patterns of the first coil and the second coil may be spiral shaped and disposed on different surfaces of the board.

The conductive pattern of the first coil and the conductive pattern of the second coil may be offset in a thickness direction of the board so as not to overlap each other.

The resonance loop performs parallel resonance by a magnetic field of the source loop.

The source loop may be connected to either one or both of a near field communications (NFC) integrated circuit and a magnetic secure transmission (MST) integrated circuit.

Other features and aspects will be apparent after an understanding of the following detailed description, drawings, and claims.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
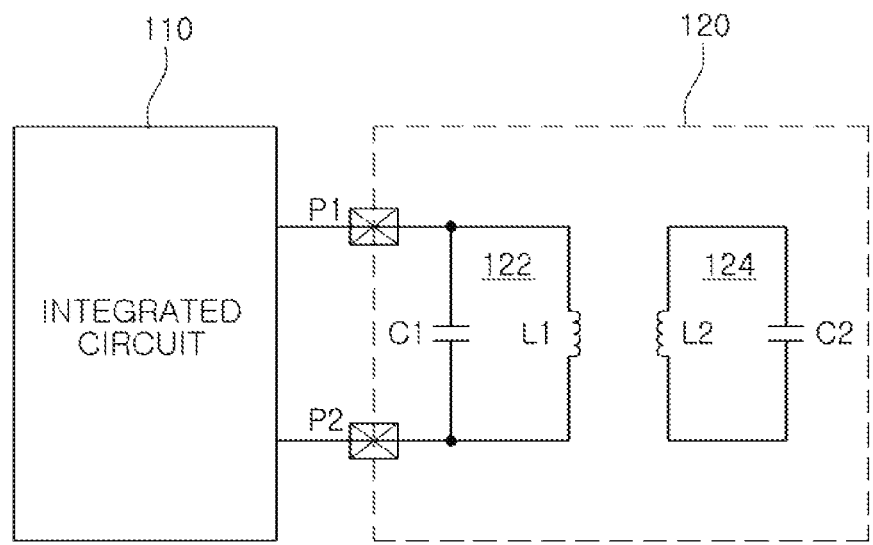
FIG. 1 is a diagram illustrating a communications device according to an exemplary embodiment in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. In addition, the use of the term "may" herein with respect to an example or embodiment, e.g., as to what an example or embodiment may include or implement, means that at least one example or embodiment exists where such a feature is included or implemented while all examples and embodiments are not limited thereto.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Hereinafter, exemplary embodiments of the present disclosure will now be described in detail with reference to the accompanying drawings.

FIG. 1 is a diagram illustrating a communications device according to an exemplary embodiment in the present disclosure.

Referring to FIG. 1, a communications device according to the present disclosure may include an integrated circuit 110 and an antenna 120.

The integrated circuit 110 may include either one or both of a near field communication (NFC) integrated circuit (IC) and a wireless power transmission (WPT) IC.

When the integrated circuit 110 is implemented as the NFC IC, the NFC IC may store and process various information such as user information and payment information of the communications device. The NFC IC may perform communications with an external device such as an NFC reader. A transmission signal generated from the NFC IC may be transmitted through the antenna 120, and a reception signal received through the antenna 120 may be processed through a demodulating circuit included in the NFC IC.

When the integrated circuit 110 is implemented as the WPT IC, the WPT IC may provide alternating current (AC) power having a predetermined frequency to the antenna 120. When the AC power is provided to the antenna 120 by the WPT IC, the antenna 120 may wirelessly transmit the AC power to an external wireless power receiver.

The antenna 120 may be connected to the integrated circuit 110 through terminals P1 and P2. The antenna 120 may transmit the current, the power, the transmission signal, and the like provided from the integrated circuit 110 as an electromagnetic wave.

The antenna 120 may be formed in a loop antenna structure. As an example, the antenna 120 may be formed in a double resonance loop structure for high electromagnetic efficiency, and may include a source loop 122 and a resonance loop 124 which are electrically separated from each other. The antenna 120 may be implemented by forming a conductive pattern on a board, and as an example, the board may include either one or both of a printed circuit board (PCB) and a flexible printed circuit board (FPCB).

The source loop 122 may include a first capacitor C1 and a first coil L1 which are connected in parallel to the integrated circuit 110 and two antenna terminals P1 and P2. The first capacitor C1 may be provided by the conductive pattern formed on the board, and the first coil L1 may be formed by the conductive pattern of a spiral shape formed on the board.

The resonance loop 124 may be electrically separated from the source loop 122. Energy may be charged to or discharged from a second capacitor C2 and a second coil L2 of the resonance loop 124 by magnetic induction by the source loop 122. When the current provided from the integrated circuit 110 flows in the source loop 122, a magnetic field may induce around a coil of the source loop 122. In this case, an induced current may flow in the coil of the resonance loop 124 by the magnetic field formed around the source loop 122. That is, the resonance loop 124 may be supplied with power from the source loop 122 by the magnetic induction. The first coil L1 and the first capacitor C1 of the source loop 122 may be determined to resonate at a center frequency by a signal which is output from the integrated circuit 110, and a magnetic field generated from the antenna 120 may be increased by the magnetic field of the source loop 122 and the magnetic field of the resonance loop 124.

The second coil L2 of the resonance loop 124 may be formed by the conductive pattern of the spiral shape formed on the board, and the second capacitor C2 may be formed by the conductive pattern formed on the board.

Figure 2:
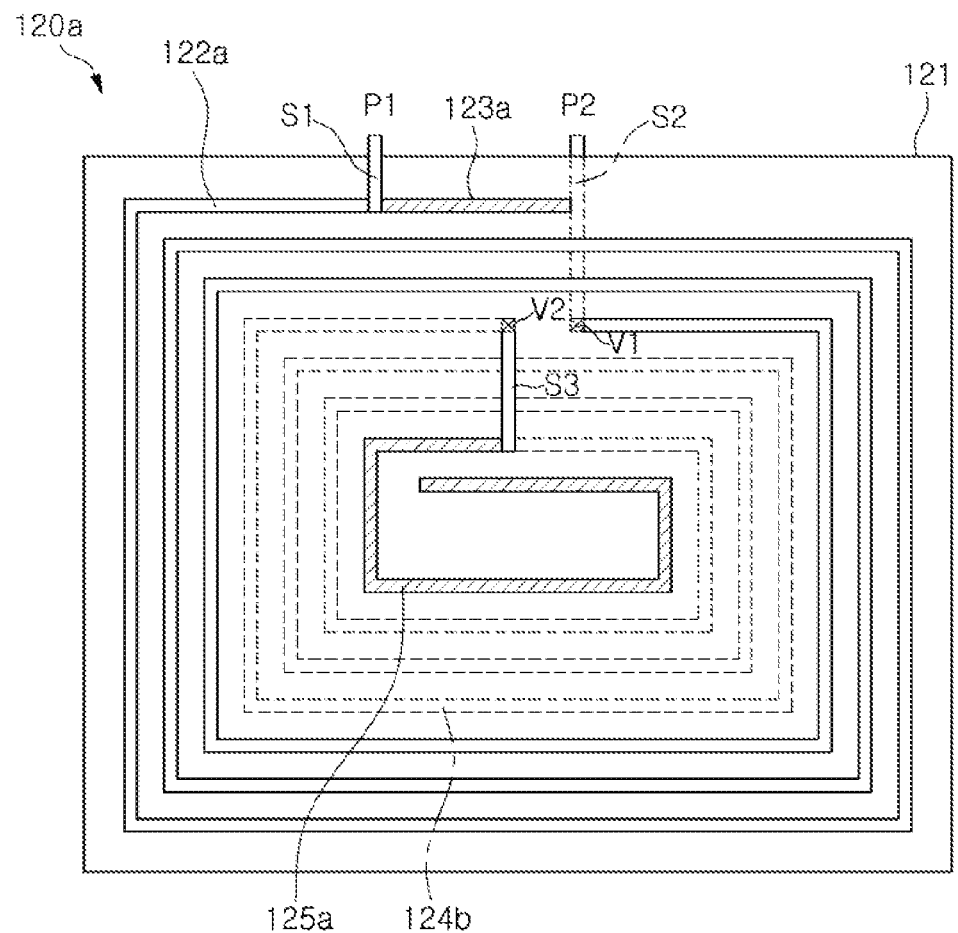
FIG. 2 is a top view of a double resonance loop antenna according to an exemplary embodiment in the present disclosure.
Figure 3:
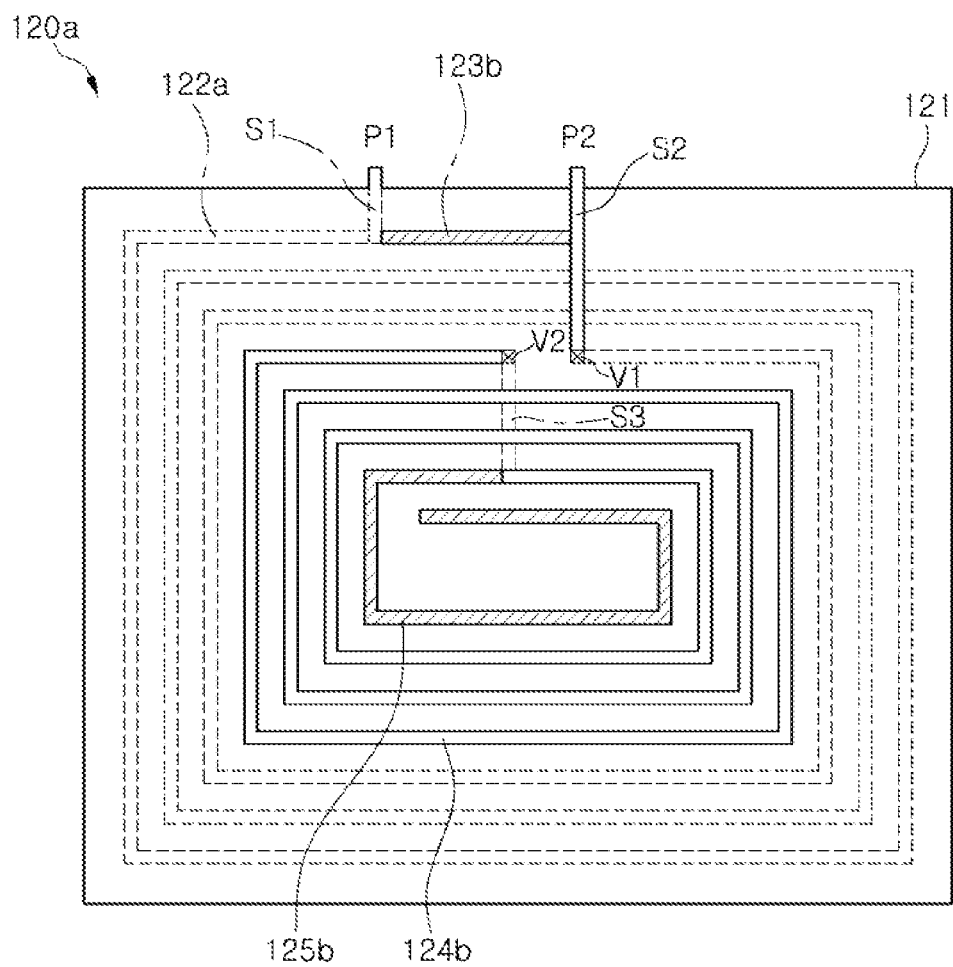
FIG. 3 is a projective bottom view of the double resonance loop antenna according to an exemplary embodiment in the present disclosure.

FIG. 2 is a top view of a top surface of a double resonance loop antenna according to an exemplary embodiment in the present disclosure and FIG. 3 is a top view of a bottom surface of the double resonance loop antenna according to an exemplary embodiment in the present disclosure. FIG. 3 is a view of the bottom surface the double resonance loop antenna viewed from a top surface. Therefore, FIG. 2 is from a top viewing angle and shows components of the top surface in solid lines and components of the bottom surface in dotted lines, whereas FIG. 3 is from the same top viewing angle as FIG. 2 but shows components of the bottom surface in solid lines and components of the top surface in dotted lines. In a case in which the bottom surface of the double resonance loop antenna is viewed from the bottom surface, left and right of the FIG. 3 may be reversed.

Referring to FIGS. 2 and 3, a double resonance loop antenna 120a may include a source coil pattern 122a, source capacitor patterns 123a and 123b, a resonance coil pattern 124b, and resonance capacitor patterns 125a and 125b. The above-mentioned patterns may be formed in conductive patterns such as metal strap.

The source coil pattern 122a, the source capacitor pattern 123a, and the resonance capacitor pattern 125a may be formed on a top surface of a board 121, and the source capacitor pattern 123b, the resonance coil pattern 124b, and the resonance capacitor pattern 125b may be formed a bottom surface of the board 121. A plurality of vias V1 and V2 and conductive lines S1 to S3 for electrically connecting the patterns to each other may be prepared on the board 121. A first conductive line S1 connected to a first terminal P1 may be prepared on the top surface of the board 121, and a second conductive line S2 connected to a second terminal P2 may be prepared on the bottom surface of the board 121.

The source coil pattern 122a, and the source capacitor patterns 123a and 123b may be formed between two terminals P1 and P2 to form the source loop 122. The first coil L1 may be provided by the source coil pattern 122a, and the first capacitor C1 may be provided by the source capacitor patterns 123a and 123b.

In addition, the resonance coil pattern 124b and the resonance capacitor patterns 125a and 125b may be connected to each other in series to form the resonance loop 124. The second coil L2 may be provided by the resonance coil pattern 124b, and the second capacitor C2 may be provided by the resonance capacitor patterns 125a and 125b.

The source coil pattern 122a, and the source capacitor patterns 123a and 123b may be formed between two terminals P1 and P2 to form the source loop 122.

A loop for forming the source coil pattern 122a may be turned several times with the first conductive line S1 as a starting point on the top surface of the board 121, and may be terminated at a first via V1 for connection with the second terminal P2.

The source coil pattern 122a may be provided in a spiral shape, and a size of the first coil L1 which is provided as a distributed circuit constant may be determined according to the number of turns of the loop forming the source coil pattern 122a. An end of the source coil pattern 122a may be connected to the second conductive line S2 formed on the bottom surface of the board 121 by the first via V1, and the source coil pattern 122a may be connected to the second terminal P2 by the second conductive line S2. Therefore, the two terminals P1 and P2, and the source coil pattern 122a may be electrically connected to each other.

The source capacitor patterns 123a and 123b may be symmetrically formed on the top surface and the bottom surface of the board 121, respectively, and may provide the first capacitor C1 in a form of a metal-insulator-metal (MIM) capacitor using the board 121 as a dielectric film.

The source coil pattern 122a starting from the first conductive line S1 may be connected to the source capacitor pattern 123a. The source capacitor pattern 123a may be formed by extending the conductive patterns configuring the source coil pattern 122a. The source capacitor pattern 123a may be a conductive pattern having the same line width and thickness as the source coil pattern 122a.

The source capacitor pattern 123b may be formed on the bottom surface of the board 121 to be symmetrical with the source capacitor pattern 123a. Thus, the source capacitor pattern 123a may overlap and be distanced from the source capacitor pattern 123b in a thickness direction of the board 121. The source capacitor pattern 123a may be connected to the first conductive line S1 on the top surface of the board 121, and the source capacitor pattern 123b may be connected to the second conductive line S2 on the bottom surface of the board 121. Therefore, the first capacitor C1 formed between the two terminals P1 and P2 may be provided by the source capacitor patterns 123a and 123b which are symmetrically formed on the top and bottom surfaces of the board 121 and are electrically separated from each other.

In the drawings, the conductive pattern of the source capacitor pattern 123a and the conductive pattern of the source coil pattern 122a are illustrated in different shadings for classification. However, these conductive patterns may be formed in a continuous form in the same material and form. However, the source capacitor pattern 123b of the same form may be formed on the bottom surface of the source capacitor pattern 123a, but the conductive pattern may not be present on the bottom surface of the source coil pattern 122a.

In a case in which the source capacitor patterns 123a and 123b are formed in the form of the MIM capacitor, in order to increase selectivity Q, the line width or length of the source capacitor patterns 123a and 123b, and a gap between a top pattern and a bottom pattern may be adjusted. Alternatively, the source capacitor patterns 123a and 123b may be formed in the illustrated form so that a direction of the current flowing in the source coil pattern 122a and a direction of the current flowing in the source capacitor patterns 123a and 123b coincide with each other.

The resonance coil pattern 124b and the resonance capacitor patterns 125a and 125b may be connected to each other in series to form the resonance loop 124.

The loop for configuring the resonance coil pattern 124b may be turned several times with the second via V2 as the starting point on the bottom surface of the board 121 and may be terminated at one point. The resonance coil pattern 124b may be provided in a spiral shape, and a size of the second coil L2 which is provided as a distributed circuit constant may be determined according to the number of turns of the loop forming the resonance coil pattern 124b.

The source coil pattern 122a and the resonance coil pattern 124b may be electrically separated from each other.

The resonance coil pattern 124b and the source coil pattern 122a may be formed on different surfaces of the board 121. A degree of freedom of a circuit design may be increased by forming the resonance coil pattern 124b and the source coil pattern 122a formed in the spiral shape on the top and bottom surfaces of the board 121 and occupying most of a region on the different surfaces. In addition, the resonance coil pattern 124b and the source coil pattern 122a may be formed on different regions in a thickness direction of the board 121. By forming the resonance coil pattern 124b and the source coil pattern 122a on different regions which do not overlap each other in the thickness direction of the board 121 (such that the resonance coil pattern 124b and the source coil pattern 122a are offset from each other), parasitic capacitance generated when the resonance coil pattern 124b and the source coil pattern 122a overlap each other on the same region may be removed or prevented.

The resonance capacitor patterns 125a and 125b may be symmetrically formed on the top surface and the bottom surface of the board 121, and may provide the second capacitor C2 in the form of the metal-insulator-metal (MIM) capacitor using the board 121 as the dielectric film. Thus, the resonance capacitor pattern 125a may overlap and be distanced from the resonance capacitor pattern 125b in a thickness direction of the board 121.

An inside end of the resonance coil pattern 124b may be connected to the resonance capacitor pattern 125b. The resonance capacitor pattern 125b may be formed by extending the conductive patterns configuring the resonance coil pattern 124b. The resonance capacitor pattern 125b may be a conductive pattern having the same line width and thickness as the resonance coil pattern 124b.

The resonance capacitor pattern 125a may be formed on the top surface of the board 121 to be symmetrical with the resonance capacitor pattern 125b. The resonance capacitor pattern 125a may be connected to a third conductive line S3 connected to the second via V2 on the top surface of the board 121. Therefore, the second capacitor C2 which is connected in series with the second coil L2 may be provided by the resonance capacitor patterns 125a and 125b which are symmetrically formed on the top and bottom surfaces of the board 121 and are electrically separated from each other.

In the drawings, the conductive pattern of the resonance capacitor pattern 125b and the conductive pattern of the resonance coil pattern 124b are illustrated in different shadings for classification. However, these conductive patterns may be formed in a continuous form in the same material and form. However, the resonance capacitor pattern 125a of the same form may be formed on a top surface of the resonance capacitor pattern 125b, but the conductive pattern may not be present on a bottom surface of the resonance coil pattern 124b.

In a case in which the resonance capacitor patterns 125a and 125b are formed in the form of the MIM capacitor, in order to increase selectivity Q, the line width or length of the resonance capacitor patterns 125a and 125b, and a gap between a top pattern and a bottom pattern may be adjusted. Alternatively, the resonance capacitor patterns 125a and 125b may be formed in the illustrated form so that a direction of the current flowing in the resonance coil pattern 124b and a direction of the current flowing in the resonance capacitor patterns 125a and 125b coincide with each other.

Figure 4:
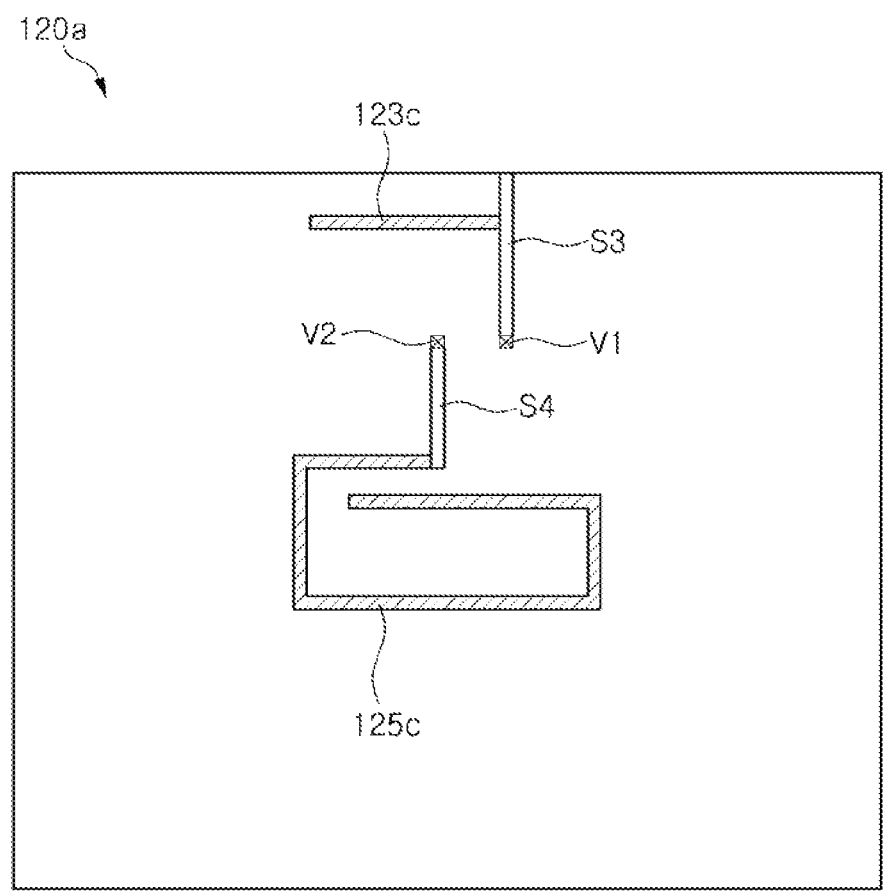
FIG. 4 is a view illustrating an inner layer of a board according to an exemplary embodiment in the present disclosure.

FIG. 4 is a view illustrating an inner layer of a board of a double loop antenna 120a according to an exemplary embodiment in the present disclosure.

The board 121 according to an exemplary embodiment may be a multilayer board that further includes at least one layer other than the top surface and the bottom surface. The inner layer of the board illustrated in FIG. 4 may correspond to at least one layer other than the top surface and the bottom surface, and may be inserted into at least one inner layer of the board of the double resonance loop antenna according to the exemplary embodiment of FIGS. 2 and 3. Accordingly, the inner layer of FIG. 4 may be disposed between the top surface and bottom surface of the board 121. In a case in which the inner layer of FIG. 4 is applied to the board of the double resonance loop antenna of FIGS. 2 and 3, the first capacitor C1 and the second capacitor C2 may be provided in the form of the MIM capacitor by conductive patterns of at least three layers.

Referring to FIG. 4, the inner layer of the board 121 may include a source capacitor pattern 123c and a resonance capacitor pattern 125c. The source capacitor pattern 123c may be formed between the source capacitor pattern 123a on the top surface of the board 121 and the source capacitor pattern 123b on the bottom surface of the board 121 to increase the capacitance of the first capacitor C1. The source capacitor pattern 123c may be formed symmetrically with the source capacitor pattern 123a on the top surface of the board 121 and the source capacitor pattern 123b on the bottom surface of the board 121, such that the source capacitor pattern 123c overlaps either one or both of the resonance capacitor patterns 123a and 123b in a thickness direction of the board 121, and the source capacitor pattern 123c may be connected to the first via V1 through the conductive line S3.

In addition, the coil capacitor pattern 123c may be formed between the coil capacitor pattern 123a on the top surface of the board 121 and the coil capacitor pattern 123b on the bottom surface of the board 121 to increase the capacitance of the second capacitor C2. The resonance capacitor pattern 125c may be formed symmetrically with the resonance capacitor pattern 125a on the top surface of the board 121 and the resonance capacitor pattern 125b on the bottom surface of the board 121, such that the resonance capacitor pattern 125c overlaps either one or both of the resonance capacitor patterns 125a and 125b in a thickness direction of the board 121, and the resonance capacitor pattern 125c may be connected to the second via V2 through a conductive line S4.

Although FIG. 4 illustrates a case in which both the source capacitor pattern 123c and the resonance capacitor pattern 125c are formed on the inner layer of the board 121, in an alternative embodiment, only one of the source capacitor pattern 123c and the resonance capacitor pattern 125c may be formed on the inner layer according to selectivity and required capacitance.

As set forth above, according to the exemplary embodiments in the present disclosure, the capacitors of the double loop antenna are provided in the MIM capacitor form, whereby spatial efficiency may be increased, and miniaturization of the portable electronic device may be achieved.

In addition, the conductive patterns of at least two coils of the double loop antenna are formed on different surfaces of the board, whereby the degree of freedom of the circuit design may be increased, and the conductive patterns of at least two coils of the double loop antenna are formed on different regions which do not overlap in the thickness direction of the board, whereby the parasitic capacitance may be removed or prevented.

Further, the conductive pattern of the capacitor is additionally prepared on the inner layer of the board, whereby the capacitance of the capacitor may be increased.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A double loop antenna comprising:
   a source loop comprising:
      a spiral-shaped conductive source coil pattern disposed on a top surface of a board, and
      a source capacitor pattern comprising symmetrical conductive patterns disposed on the top surface and a bottom surface of the board; and
   a resonance loop comprising:
      a spiral-shaped conductive resonance coil pattern disposed on the bottom surface of the board, and
      a resonance capacitor pattern comprising symmetrical conductive patterns disposed on the top surface and the bottom surface of the board,
   wherein the source coil pattern and the resonance coil pattern are formed on different surfaces of the board.

2. The double loop antenna of claim 1, wherein the source coil pattern and the resonance coil pattern are disposed on different regions in a thickness direction of the board.

3. The double loop antenna of claim 1, wherein the source capacitor pattern extends from the source coil pattern.

4. The double loop antenna of claim 3, wherein the conductive patterns of the source capacitor pattern and the source coil pattern have the same line width and thickness.

5. The double loop antenna of claim 1, wherein the source capacitor pattern is disposed on an outer periphery of the board.

6. The double loop antenna of claim 1, wherein the resonance capacitor pattern extends from the resonance coil pattern.

7. The double loop antenna of claim 1, wherein the resonance capacitor pattern is surrounded by the source coil pattern and the resonance coil pattern.

8. The double loop antenna of claim 1, wherein the resonance capacitor pattern comprises a spiral shape.

9. The double loop antenna of claim 1, wherein the conductive patterns of the source capacitor pattern comprise a metal-insulator-metal (MIM) capacitor.

10. The double loop antenna of claim 1, wherein the conductive patterns of the resonance capacitor pattern comprise a metal-insulator-metal (MIM) capacitor.

11. The double loop antenna of claim 1, wherein the board comprises an inner layer, and
   a conductive pattern of the inner layer is symmetrical with either one or both of the conductive patterns of the source capacitor pattern and the conductive patterns of the resonance capacitor pattern.

12. The double loop antenna of claim 1, wherein the source loop and the resonance loop are electrically separated from each other.

* * * * *